(12) United States Patent
Schwartz et al.

(10) Patent No.: US 10,994,503 B2
(45) Date of Patent: May 4, 2021

(54) FACILITY FOR DEPOSITING A SHAPED FILED ROVING

(71) Applicant: SAFRAN CERAMICS, Le Haillan (FR)

(72) Inventors: Mathieu Schwartz, Moissy-Cramayel (FR); Arnaud Delehouze, Moissy-Cramayel (FR); Nicolas Laval, Moissy-Cramayel (FR); Bertrand Desjoyeaux, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 16/758,277

(22) PCT Filed: Oct. 23, 2018

(86) PCT No.: PCT/FR2018/052632
§ 371 (c)(1),
(2) Date: Apr. 22, 2020

(87) PCT Pub. No.: WO2019/081846
PCT Pub. Date: May 2, 2019

(65) Prior Publication Data
US 2020/0338840 A1 Oct. 29, 2020

(30) Foreign Application Priority Data

Oct. 24, 2017 (FR) ...................................... 1760015

(51) Int. Cl.
*B28B 23/02* (2006.01)
*B29B 15/14* (2006.01)
(Continued)

(52) U.S. Cl.
CPC .............. *B29C 70/52* (2013.01); *B28B 23/02* (2013.01); *B29B 15/125* (2013.01); *B29B 15/14* (2013.01);
(Continued)

(58) Field of Classification Search
CPC ......... B28B 23/02; B29B 15/10; B29B 15/12; B29B 15/122; B29B 15/125; B29B 15/14;
(Continued)

(56) References Cited

U.S. PATENT DOCUMENTS 5,205,898 A * 4/1993 Wilson .................. B29B 15/125
118/124
5,266,139 A * 11/1993 Yokota ................ B29C 53/8041
156/158

(Continued)

FOREIGN PATENT DOCUMENTS

EP  1 197 597 A1  4/2002
FR  2 880 016 A1  6/2006
(Continued)

OTHER PUBLICATIONS

International Preliminary Report on Patentability and the Written Opinion of the International Searching Authority as issued in International Patent Application No. PCT/FR2018/052632, dated Apr. 28, 2020.

(Continued)

*Primary Examiner* — Michael A Tolin
(74) *Attorney, Agent, or Firm* — Pillsbury Winthrop Shaw Pittman LLP

(57) ABSTRACT

An installation for depositing a shaped filled roving intended to be used to manufacture a composite-material component, includes a device for feeding a fibrous roving impregnated with a composition including a binder and ceramic or carbon fillers, a die for shaping and draining the binder defined by (Continued)

at least one porous surface, the die having an evolving section between an inlet section and an outlet section, the inlet section being larger than the outlet section, a support in communication with the die outlet on which the shaped roving is to be deposited, and a first conveying device configured to convey the roving from the feed device through the die and to the support.

14 Claims, 2 Drawing Sheets

(51) Int. Cl.
      *B29C 70/38*     (2006.01)
      *B29C 70/52*     (2006.01)
      *B29K 507/04*    (2006.01)
      *B29K 509/02*    (2006.01)
      *B29K 509/04*    (2006.01)
      *C04B 35/622*    (2006.01)
      *C04B 35/80*     (2006.01)
      *B29B 15/12*     (2006.01)

(52) U.S. Cl.
    CPC ............ *B29C 70/38* (2013.01); *B29C 70/382* (2013.01); *C04B 35/622* (2013.01); *C04B 35/80* (2013.01); *B29K 2507/04* (2013.01); *B29K 2509/02* (2013.01); *B29K 2509/04* (2013.01); *C04B 2235/5252* (2013.01)

(58) Field of Classification Search
    CPC ..... B29C 70/38; B29C 70/382; B29C 70/384; B29C 70/386; B29C 70/388; B29C 70/52; B29C 70/521; B29C 70/523; B29C 70/525; B29C 70/526; B29C 70/527; B29C 70/528; B29K 2507/04; B29K 2509/02; B29K 2509/04; C04B 35/117; C04B 35/14; C04B 35/185; C04B 35/46; C04B 35/486; C04B 35/565; C04B 35/622; C04B 35/6263; C04B 35/63408; C04B 35/63416; C04B 35/63424; C04B 35/6346; C04B 35/63496; C04B 35/80; C04B 35/806; C04B 35/82; C04B 35/83; C04B 2235/3217; C04B 2235/3232; C04B 2235/3244; C04B 2235/3418; C04B 2235/3817; C04B 2235/3826; C04B 2235/422; C04B 2235/5224; C04B 2235/5228; C04B 2235/5232; C04B 2235/5244; C04B 2235/5248; C04B 2235/5252; C04B 2235/616

See application file for complete search history.

(56) References Cited

U.S. PATENT DOCUMENTS

| | | | |
|---|---|---|---|
| 5,395,648 A | | 3/1995 | David et al. |
| 6,514,370 B1 * | | 2/2003 | Belvin ................ B29C 70/50 |
| | | | 156/166 |
| 2017/0274561 A1 * | | 9/2017 | Ong ..................... B29B 15/122 |
| 2017/0334094 A1 * | | 11/2017 | Pellet .................... B29C 43/58 |
| 2018/0186100 A1 * | | 7/2018 | Kiilunen ............. B29C 70/542 |

FOREIGN PATENT DOCUMENTS

| | | |
|---|---|---|
| FR | 2 958 933 A1 | 10/2011 |
| FR | 3 030 502 A1 | 6/2016 |
| FR | 3 030 503 A1 | 6/2016 |
| FR | 3 030 505 A1 | 6/2016 |
| JP | 2001-334515 A | 12/2001 |
| JP | 2003-191215 A | 7/2003 |

OTHER PUBLICATIONS

International Search Report as issued in International Patent Application No. PCT/FR2018/052632, dated Jan. 7, 2019.

* cited by examiner

FACILITY FOR DEPOSITING A SHAPED FILED ROVING

CROSS-REFERENCE TO RELATED APPLICATIONS

This application is the U.S. National Stage of PCT/FR2018/052632, filed Oct. 23, 2018, which in turn claims priority to French patent application number 1760015 filed Oct. 24, 2017. The content of these applications are incorporated herein by reference in their entireties.

BACKGROUND OF THE INVENTION

The present invention relates to the general field of installations for depositing a shaped filled roving intended to be used to manufacture a composite-material component. The invention also relates to a process for manufacturing a composite-material component using such an installation.

It is known to produce composite-material components by draping in the form of pre-impregnated fibrous reinforcement layers. In some current techniques, draping is done manually by an operator. These techniques can lead to relatively high component production costs and the risk of errors in the positioning of the layers. This leads to a certain variability in the mechanical performance of the components obtained and to components whose mechanical properties can be improved.

Other solutions, such as automatic fiber placement (AFP), have been developed. This mechanized technique is of interest to reduce the production cost of composite-material components. In the prior art, fibrous layers are draped over a surface to obtain a preform of the component to be obtained, then a slip comprising ceramic or carbon particles is injected into the porosity of the draped preform, and finally the particles are sintered to form the matrix. Although effective, the time and cost of such processes can be further reduced.

SUBJECT MATTER AND SUMMARY OF THE INVENTION

For this purpose, the invention provides, according to a first aspect, an installation for depositing a shaped filled roving intended to be used for manufacturing a composite-material component, the installation comprising at least:
  a device for feeding a fibrous roving impregnated with a composition comprising a binder and ceramic or carbon fillers,
  a die for shaping and draining the binder defined by at least one porous surface, the die having an evolving section between an inlet section and an outlet section, the inlet section being greater than the outlet section,
  a support in communication with the die outlet on which the shaped roving is to be deposited, and
  a first conveying device configured to transport the roving from the feed device through the die and to the support.

"Roving" means an assembly of fibers or filaments running substantially parallel to each other and joined together to form a non-woven web. The inlet or outlet cross-section is the area defined by the inlet or outlet opening of the spinneret.

With such an installation, it becomes possible to manufacture a shaped filled roving, i.e. which is impregnated with a composition comprising a binder and fillers and having predefined dimensions, which can be used in a manufacturing process using the AFP technique. The binder shaping and draining die of the installation according to the invention thus makes it possible to calender the roving to a predetermined size while eliminating part of the binder and trapping the fillers in the roving, in order to obtain a higher rate of fillers in the roving. The filler rate is increased by reducing the volume occupied by the roving by draining part of the binder, without allowing the fillers to escape by filtration through the porous surface.

By virtue of such an installation, by sufficiently increasing the rate of fillers in the roving, it is no longer necessary to carry out a slip injection step, or more generally to introduce additional fillers, into the porosity of the deposited rovings to form a preform. In other words, by increasing the rate of fillers in the roving as the installation allows, and by using a binder that can be removed (for example under the effect of heat), it is possible to sinter directly the preform consisting of a draping of rovings exiting the installation, and to obtain the desired porosity without first having to carry out a step of introducing fillers into the preform.

In general, the pore size of the porous surface should be chosen to ensure drainage of the binder while trapping the fillers in the roving. The pore size of the porous surface may be strictly smaller than the size of the fillers. In one example, the pore size D90 of the pores may be strictly smaller than the filler size D10. For example, the pore size D90 may be less than or equal to 10 μm, or less than or equal to 5 μpm, or less than or equal to 0.3 μm. Note that the pore size of the porous surface need not be smaller than the size of the fillers. Indeed, the fillers generally partially block pores that are larger than the size of the fillers, thus reducing the effective pore size and still providing the filtration function.

In an example embodiment, the material of the porous surfaces can be a porous material with open porosity to ensure drainage of the binder. The porous material can be microporous or nanoporous, for example a nanoporous ceramic material obtainable by partial sintering of ceramic powders, a ceramic or metal foam, or a microporous organic material.

In an example embodiment, the installation may also include a second conveying device configured to circulate a porous film between the roving and the porous surface, the porous film having a pore size strictly greater than the size of the fillers. This film facilitates the conveying of the roving through the die while being permeable to the composition. For example, the pore size D50 of the porous film can be at least twice the size D50 of the fillers.

In an example embodiment, the installation may further include a pumping device in communication with the porous surfaces. For example, the pumping device may include a pump connected to each of the porous surfaces. The presence of the pumping device can improve the drainage of the binder when conveying the roving through the die alone is not efficient enough.

In an example embodiment, the installation includes a heating device for the die. This device heats the roving passing through the die. Thus, it enables the viscosity of the binder to be adjusted, for example to soften or liquefy it, to facilitate drainage.

In an example embodiment, the installation may further include a dispensing head in communication with the die outlet and configured to deposit the shaped roving on the substrate.

In an example embodiment, the dispensing head can be a dispensing head for automatic fiber placement, i.e. for the implementation of an AFP technique. For the sake of brevity, the automatic fiber placement technique is hereinafter referred to as the AFP technique.

In an example embodiment, the support can constitute a storage roll of the shaped roving. In some cases, it may be advantageous for the installation to additionally include a plastic film feed device in communication with the storage roll, in order to separate the layers of roving wound on the storage roll by a plastic film and allow their subsequent separation to unwind the roving more easily.

In an example embodiment, the porous surface can be moved in a direction transverse to a direction of conveying the roving through the die. This advantageous arrangement allows the porous surface to compact the roving in the die to improve the drainage of the binder.

In an example embodiment, the die can consist of two porous surfaces facing each other.

Finally, according to a second aspect, the invention relates to a process for manufacturing a composite-material component, comprising at least:

forming a fibrous preform comprising the ceramic or carbon fillers from one or more rovings formed using the above installation, and forming a matrix in the porosity of the fibrous preform from the ceramic or carbon fillers.

In an example embodiment, the matrix can be formed by sintering the fillers. During the sintering step, the binder can be removed and thus forms a fugitive binder. With such an arrangement, the matrix can be obtained in a single sintering heat treatment step.

In an example embodiment, the roving can be advanced step by step through the die during shaping. Advantageously, the porous surface can be movable in a transverse direction in relation to a direction of conveying the roving in the die in order to compact the roving and drain the binder between two successive advances.

BRIEF DESCRIPTION OF THE DRAWINGS

Other features and advantages of the present invention will be apparent from the description given below, with reference to the appended drawings which illustrate a non-limiting example embodiment. In the figures.

DETAILED DESCRIPTION OF THE INVENTION

Figure 1:
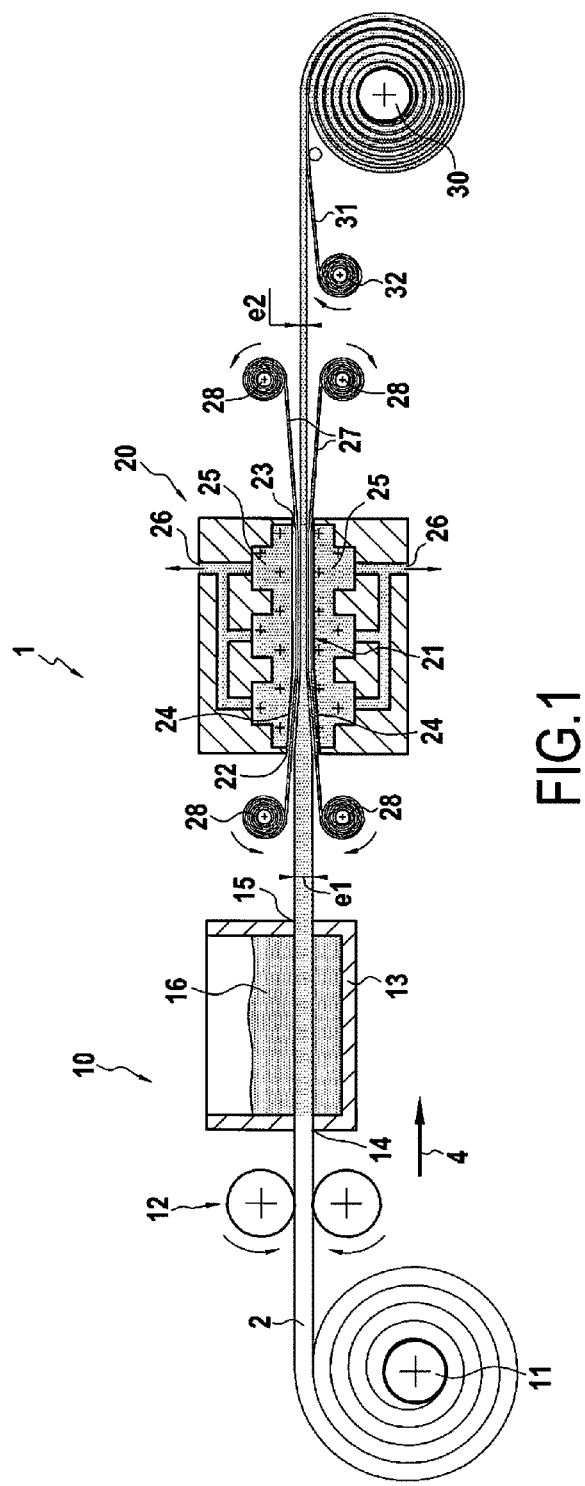
FIG. 1 is a schematic sectional view showing an installation according to an embodiment of the invention.

FIG. 1 shows an installation 1 according to an embodiment of the invention. The installation 1 is intended to be used to deposit a filled and shaped roving 2, the roving 2 itself being intended to be used to manufacture a composite-material component. In the example shown here, the roving 2 moves in the installation 1 in the direction indicated by the arrow 4, corresponding to the conveying direction.

The installation 1 comprises, from upstream to downstream in the direction of conveyance of the roving 2: a feed device 10 for fibrous roving impregnated with a composition comprising a binder and ceramic or carbon fillers, a die 20 for shaping and draining the binder fed by the feed device 10, and a roll 30 constituting a support in communication with an outlet of the die 20.

The feed device 10 includes here a roller 11 on which the still dry roving 2 can be stored. A pair of counter-rotating rollers 12 is configured to drive the roving 2 to a predefined size prior to impregnation. In the example shown, the feed device 10 further includes a tank 13 with an inlet opening 14 through which the dry roving 2 enters the tank, and an outlet opening 15 through which the impregnated roving 2 can exit. The tank 13 contains a composition 16 comprising a binder and ceramic or carbon fillers. The tank 13 may further comprise means (not shown) for homogenizing the composition 16, for example a stirring device. Inside tank 13, the roving is immersed in the composition 16 for impregnation. Other means of impregnating the roving are of course conceivable. The dry roving 2 can be stretched and at least partially de-densified before entering the tank 13, in order to allow a better impregnation of the composition inside the filaments which compose it.

The composition comprising the binder and the ceramic or carbon fillers may comprise more than 20% by volume of ceramic or carbon fillers, preferentially more than 30% by volume.

The feed device 10 can be configured so that before impregnation of the roving 2, the latter has larger dimensions than the roving 2 will have at the die outlet (final dimensions). For example, when the roving 2 has a rectangular cross-section, its width in the feed device 10 can be between 110% and 120% of its final width, and its thickness e1 can be between 110% and 160% of its final thickness e2. It can be ensured that the roving 2 is sufficiently ventilated when entering the tank 13 to make the impregnation more effective.

Various materials can be considered to constitute the fibers of the roving 2. In particular, it can be made of ceramic or carbon fibers. Ceramic fibers may be fibers of non-oxide material, such as silicon carbide SiC, or oxide material such as alumina, glass (glass fibers) or mullite. In an example embodiment, the fibers used can be SiC fibers supplied as "Nicalon", "Hi-Nicalon" or "Hi-Nicalon-S" by the Japanese company Nippon Carbon or "Tyranno SA3" by the company UBE. Alumina fibers supplied as "Nextel" by 3M can also be used. Fibers supplied under the name Torayca T300 by the Toray Company are an example of usable carbon fibers. The roving may further include polymeric fibers, such as aramid fibers (Kevlar®), boron fibers, or carbon fibers, or a mixture of such fibers. The fiber roving can be titrated to at least 5000 deniers, preferentially between 10000 and 50000 deniers.

The ceramic fillers may include, for example, a material selected from the following: SiC, $Al_2O_3$, $SiO_2$, $(3Al_2O_3, 2SiO_2)$, $TiO_2$, $ZrO_2$ or a mixture of these materials. The ceramic or carbon fillers may have a size D50 preferentially less than or equal to 5 µm, or more preferentially less than or equal to 2 µm, or even more preferentially less than or equal to 1 µm. For example, the ceramic or carbon fillers may have a size D50 between 0.3 µm and 1 µm. The size D10 of the ceramic or carbon fillers may be less than or equal to 0.3 µm.

In general, the binder can be an organic binder. The binder may include bitumen, tar or natural resin. The binder may be a one-dimensional polymer of the thermoplastic type selected from the following: polyalkylene carbonates, in particular polypropylene carbonate and polyethylene carbonate, aliphatic copolyesters, such as polybutylene succinate (PBS), semi-aromatic copolyesters, such as polyethylene terephthalate (PET) and polybutylene terephthalate (PBT), polymethyl methacrylate (PMMA), polyvinyl alcohol (PVA), and mixtures thereof. The binder can be a two-component (thermosetting) organic binder, for example comprising a resin from the epoxy family. The binder may, for example, have an average molecular weight between 10000 and 50000.

The die 20 here takes the form of a block within which is present a channel 21 extending horizontally between an inlet 22 and an outlet 23 of the die. The die 20 is configured so that the roving 2 is present in the channel 21. In the example, the channel 21 has an evolving rectangular cross-section. In particular, its cross-section at the inlet 22 is larger than its cross-section at the outlet 23. In this way, the die 20 modifies the thickness of the roving 2 from the thickness e1 to the final thickness e2. The channel 21 of the die 20 is delimited on the sides by vertical surfaces (not visible in FIG. 1) on the one hand, and vertically by porous surfaces 24 on the other hand. In the example shown, the porous surfaces are flat and inclined with respect to the horizontal. In the example, the roving 2 has a thickness that is reduced in relation to its width, and the porous surfaces 24 thus have a larger surface area than the vertical surfaces.

The porous surfaces 24 can be the surfaces of a block of porous material 25 such as a microporous or nanoporous material, for example Porex®, a block of microporous ceramic material obtained by partial sintering of a ceramic powder, a block of ceramic or metallic foam, or a microporous organic material. Each of the porous surfaces may have a volume porosity (open porosity) of 10% or more, for example between 10% and 40%. The pore size of the porous material 25 can be chosen strictly smaller than the size of the ceramic or carbon fillers, for example pore size D90 is strictly smaller than the pore size D10 of the ceramic or carbon fillers. As a general rule, care should be taken to ensure that the pore size of the porous material 25 allows the fillers to be concentrated in the roving 2, preventing them from escaping, while at the same time allowing efficient drainage of the binder from the roving 2.

Drainage can be carried out simply by conveying the roving 2 into the die, the conveying creating pressure on the porous surfaces 24 which allows the binder to be removed. However, in order to improve the drainage of the binder, especially when the binder has a high viscosity or a high level of ceramic or carbon fillers in the binder, it may be advantageous to use a pumping device (arrows in FIG. 1), such as a pump, connected to the discharge outlets 26 of the die. A heating device (not shown) can be integrated into the die, for example at the die flanks, in order to heat the binder to reduce its viscosity and improve its drainage through the porous surfaces 24. The drain outlets 26 are themselves connected to the porous surfaces 24 through the porous material 25.

Of course, the shape of the section of the channel 21 of the die can be different from the one shown, depending on the needs and desired shape of the roving 2. In addition, the die 20 may include only the two porous surfaces 24, especially when the thickness of the roving 2 is negligible in relation to its width.

Conveying of the roving 2 inside the installation 1 is provided by a first conveying device which includes for example means (not shown) for rotating the roller 11, the roll 30, and the rollers 12. The first conveying device can be configured so that the roving 2 moves through the die 20 preferentially at a speed between 0.01 m/min and 20 m/min, more preferentially between 0.1 and 10 m/min, even more preferentially between 0.1 and 2 m/min. In particular, the conveying speed will be selected sufficiently low so that the impregnation in the feed device 10 is carried out correctly and drainage in the die 20 can take place. It should be noted that the conveying can be continuous or, alternatively, semi-continuous. For example, in the semi-continuous case, the roving 2 may advance stepwise through the die, and the porous surfaces 24 may move vertically (i.e. in a direction transverse to the direction of conveyance of the roving 2 through the die) independently of each other so as to compress the roving 2 between two successive advances of the roving 2.

In order to facilitate the conveyance of the roving 2 into the die 20, it may be advantageous to use a second conveying device comprising for example a pair of moving porous films 27 which accompany the roving 2 into the die 20, each porous film 27 being driven by rollers 28 located upstream and downstream of the die 20. Each porous film 27 is positioned between a porous surface 24 and the roving 2 and in contact therewith. The porous films 27 are configured to be traversed by the binder and fillers and have the role of facilitating the conveyance of the roving 2 through the die. The pore size of the porous films 27 can thus be larger than the size of the fillers that impregnate the roving 2. For example, the pore size D90 of the porous film 27 can be strictly larger than the pore size D10 of the ceramic or carbon fillers. The feed speed of the porous film 27 can be identical to the conveying speed of the roving 2 in the installation. In a variant not shown, the installation 1 is free of porous films 27 so that the roving 2 is in contact with the porous surfaces 24 of the die 20.

In the installation shown, the roving 2 exiting the die 20 is stored on a support, here consisting of a storage roll 30. In order to prevent layers of the roving 2 wound onto the support 30 from sticking together and to make it easier to unwind, a film 31, for example plastic film, can be wound at the same time as the roving 2. The film 31 can be supplied by a plastic film supply device comprising a roll 32 arranged for example underneath the roving 2 upstream of the storage roll 30. The roving 2 stored on the roll 30 can then be used to feed a dispensing head as described below. Alternatively, the roving 2 can be used directly to feed a dispensing head in communication with the outlet of the die 20.

Figure 2:
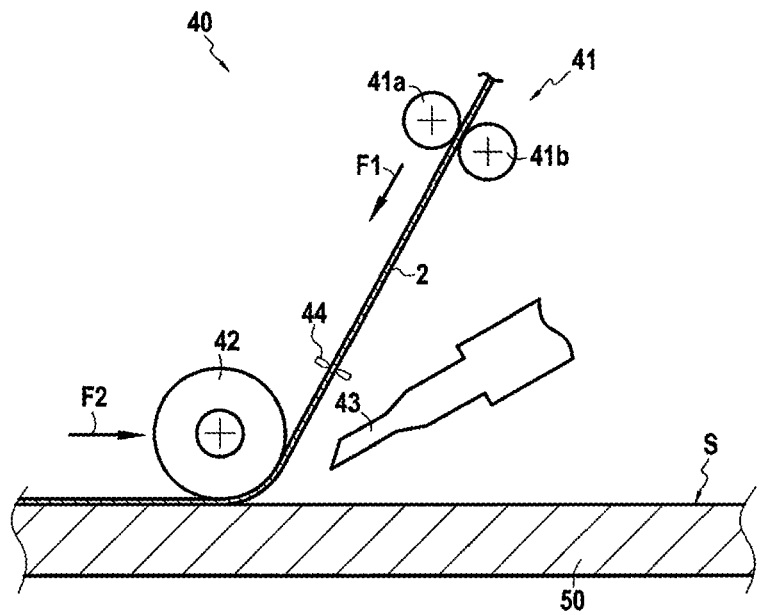
FIG. 2 is a schematic sectional view showing a dispensing head that can be used to deposit a roving to form a fibrous structure by the AFP technique.

FIG. 2 schematically illustrates the structure of a dispensing head 40 of an AFP device. The dispensing head 40 can be used in the installation 1 described above. The structure of the dispensing head 40 shown is known per se. The dispensing head 40 is fed by a roving 2 impregnated with a binder and ceramic or carbon fillers to produce a fibrous preform.

The fibrous preform is formed on the surface S of a support 50. To that end, the dispensing head 40 is fed with the roving 2. The roving 2 is conveyed by a conveying element 41 to a pressure application element 42 on the side of the surface S. The conveying element 41 is in the form of a pair of counter-rotating rollers 41a and 41b, between which the roving 2 is present. The conveying element 41 is used to advance the roving 2 to the pressure-applying element 42 in the direction indicated by the arrow F1. When the dispensing head 40 is in communication with an outlet of the die 20, then the conveying element 41 is part of the first conveying device of the installation 1.

The pressure application element 42 applies pressure to the roving 2 in order to deposit it on the surface S. The pressure application element 42 is here in the form of a roller. In addition, the dispensing head 40 may have a heating element 43 located in the vicinity of the pressure element 42. This heating element 43 makes it possible, if necessary, to heat the roving 2 during its deposition in order to liquefy the binder and thus give the deposited roving the desired adhesive power.

During deposition, the dispensing head 40 can be moved in order to apply the roving 2 on a first determined area of the surface S (arrow F2). Once the first area has been applied, the cutting element 44 on the dispensing head 40 cuts the roving 2. After this cutting, a first impregnated fibrous structure formed by a first section of the roving 2 is deposited on the first region of the surface S. Initially, before depositing the first fibrous structure, an initial layer of a thermoplastic material can be deposited on the first region of the surface S and the first fibrous structure can then be deposited on this layer of thermoplastic material. The deposition of this initial thermoplastic layer is optional.

The preform formation is then continued by advancing the roving 2 in the dispensing head 40 to the pressure application element 42 by actuating the conveying element 41. The dispensing head 40 can be moved in order to deposit the roving 2 on a second area of the surface S separate from the first area. The deposition of a second impregnated fibrous structure, formed by a second section of the roving 2, on the second zone of the surface S is then obtained in a manner similar to that described above. The production of the preform is then continued by depositing one or more further impregnated fibrous structures in the same manner as described above.

Figure 3:
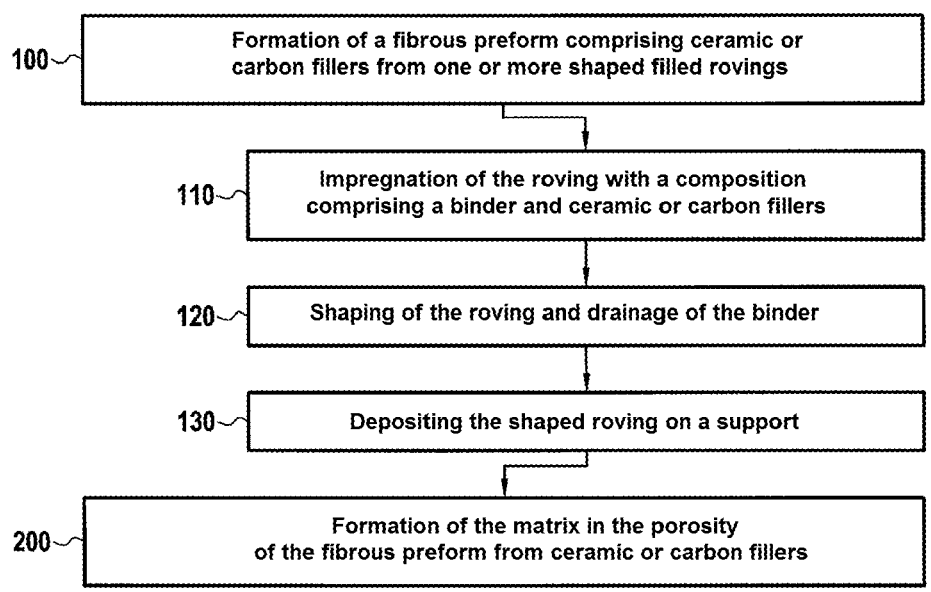
FIG. 3 is a flowchart showing the various steps of a process for manufacturing a composite-material component according to the invention.

FIG. 3 summarizes the steps in a process for manufacturing a composite-material component implementing the installation 1 presented above. The composite-material component comprises a fibrous reinforcement densified by a matrix.

The first step 100 consists of forming a fibrous preform comprising ceramic or carbon fillers from one or more impregnated rovings that have been shaped. The fibrous preform is intended to form the fibrous reinforcement of the component. This step can be carried out in an installation 1 according to the invention. Step 100 can be broken down into several sub-steps. First, a sub-step 110 consists in impregnating the roving 2 with the composition comprising a binder and ceramic or carbon fillers. This sub-step 110 is carried out in the part of the installation 1 corresponding to the feed device 10 comprising in particular the tank 16 in which the composition is present. Then a sub-step 120 consists of shaping the roving and draining part of the binder present in the roving 2. This sub-step 120 is carried out in the die 20 of the installation 1. At the outlet of the die 20 the roving is shaped to dimensions close to its final dimensions and the binder has been drained therefrom in order to increase the filler concentration in the roving 2. Then, in sub-step 130, the shaped filled roving 2 is deposited on a support. Depending on the configuration of the installation 1, the roving 2 can be deposited on a storage roll 30 and then used to feed the storage roll 30, for example, to a dispensing head 40. Alternatively, it is possible to directly feed the dispensing head 40 with the roving 2 exiting the die 20. In either case, a fibrous preform of the component can then be formed using the AFP technique using the dispensing head 40 as described above. Methods other than AFP are of course possible to form a fibrous preform from a shaped filled roving 2.

The second step 200 of the process finally consists in forming the matrix in the porosity of the fibrous preform from the ceramic or carbon fillers present therein. This step can simply consist of a sintering heat treatment of the fibrous preform. The binder that impregnates the preform can then be removed by heat, and the fillers inside the preform are sintered to fill the porosity inside the fibrous preform and obtain the final component.

The process implementing the installation according to the invention for depositing a shaped filled roving makes it possible to dispense with a step in which fillers are introduced into the preform before formation of the matrix, the fillers being already present in the preform obtained by depositing the rovings. The process according to the invention is therefore simpler and faster to carry out than the processes of the prior art.

Throughout the disclosure, the words "between . . . and . . . " should be understood to include the bounds.

The invention claimed is:

1. An apparatus for depositing a shaped filled fibrous roving for use in the manufacture of a composite-material component on a support, the apparatus comprising:
   a device for forming an impregnated fibrous roving which is impregnated with a composition comprising a binder and ceramic or carbon fillers,
   a die for shaping the impregnated fibrous roving and draining the binder to form a shaped filled fibrous roving, the die having a first porous surface configured to drain the binder, the die further having a channel extending from a die inlet to a die outlet, wherein a cross-sectional area of the die inlet is greater than a cross-sectional area of the die outlet, and wherein the impregnated fibrous roving passes through the channel, and
   the support on which the shaped filled fibrous roving is to be deposited.

2. The apparatus according to claim 1, wherein the first porous surface has a pore size smaller than a size of the fillers.

3. The apparatus according to claim 1, further comprising a conveying device comprising a porous film which travels between the impregnated fibrous roving and the first porous surface.

4. The apparatus according to claim 3, wherein the porous film has a pore size greater than a size of the fillers.

5. The apparatus according to claim 1, further comprising a pumping device in communication with the first porous surface.

6. The apparatus according to claim 1, further comprising a dispensing head configured to deposit the shaped filled fibrous roving on the support.

7. The apparatus according to claim 6, wherein the dispensing head is a dispensing head for automatic fiber placement.

8. The apparatus according to claim 1, wherein the support comprises a storage roll.

9. The apparatus according to claim 1, wherein the first porous surface is movable in a direction transverse to a conveying direction of the impregnated fibrous roving in the channel of the die.

10. The apparatus according to claim 1, further comprising a heater device for the die.

11. The apparatus according to claim 1, wherein the die further comprises a second porous surfaces configured to drain the binder, wherein the first and second porous surfaces face each other.

12. A process for manufacturing a composite-material component, comprising:
   providing the apparatus according to claim 1,
   forming the impregnated fibrous roving which is impregnated with a composition comprising a binder and ceramic or carbon fillers using the device, shaping the impregnated fibrous roving and draining the binder to form a shaped filled fibrous roving by passing the impregnated fibrous roving through the channel of the die, depositing the shaped filled fibrous roving on the support, forming a fibrous preform comprising the ceramic or carbon fillers from one or more shaped filled fibrous rovings, and forming a matrix in pores of the fibrous preform from the ceramic or carbon fillers.

13. The process according to claim 12, wherein the matrix is formed by sintering the fillers.

14. The process according to claim 12, wherein the impregnated fibrous roving advances stepwise through the channel of the die during its shaping.

* * * * *

UNITED STATES PATENT AND TRADEMARK OFFICE
CERTIFICATE OF CORRECTION

PATENT NO. : 10,994,503 B2
APPLICATION NO. : 16/758277
DATED : May 4, 2021
INVENTOR(S) : Mathieu Schwartz et al.

Page 1 of 1

It is certified that error appears in the above-identified patent and that said Letters Patent is hereby corrected as shown below:

In the Claims

Column 8, Line 58, Claim 11 should read as follows:
11. The apparatus according to claim 1, wherein the die further comprises a second porous surface configured to drain the binder, wherein the first and second porous surfaces face each other.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*